J. S. ROMIG.
ELECTRIC LIGHTING FIXTURE.
APPLICATION FILED MAY 16, 1918.
1,319,247.
Patented Oct. 21, 1919.
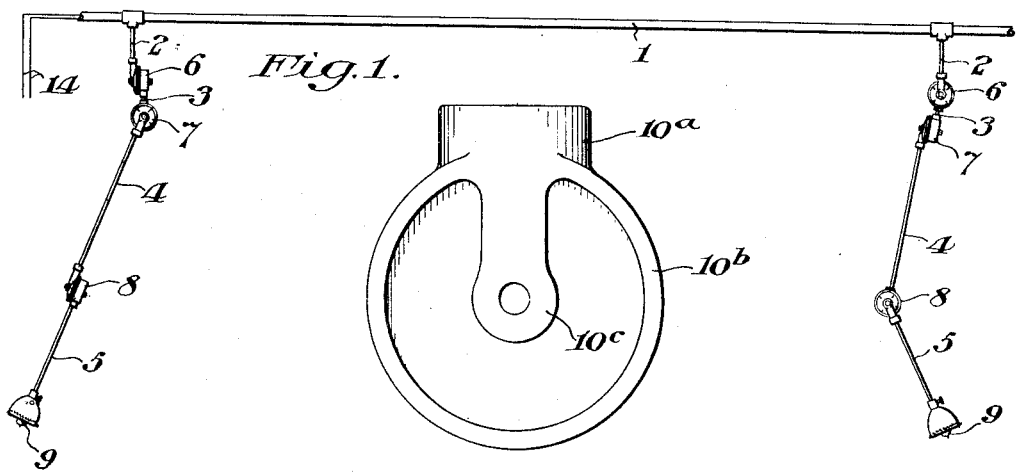
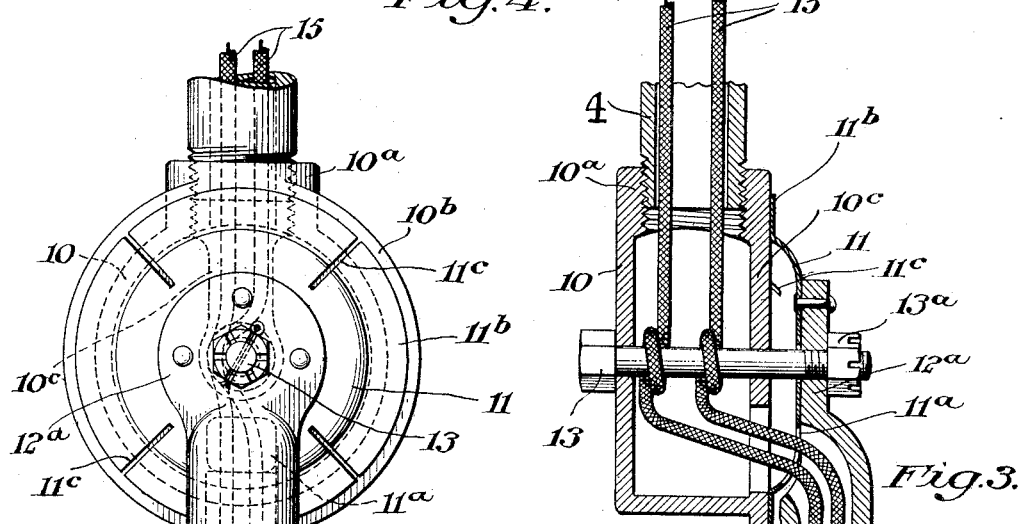
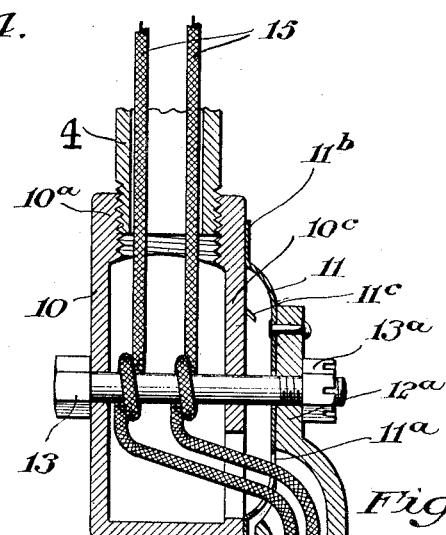
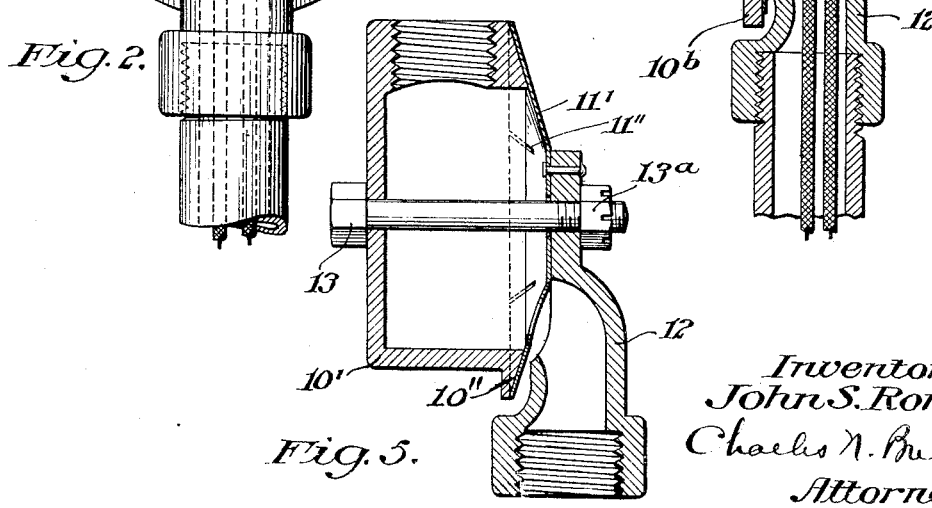
Inventor:
John S. Romig,
Charles N. Butler
Attorney.

UNITED STATES PATENT OFFICE.

JOHN S. ROMIG, OF PITTSBURGH, PENNSYLVANIA.

ELECTRIC-LIGHTING FIXTURE.

1,319,247.  Specification of Letters Patent.  Patented Oct. 21, 1919.

Application filed May 16, 1918. Serial No. 234,938.

*To all whom it may concern:*

Be it known that I, JOHN S. ROMIG, a citizen of the United States, and a resident of Pittsburgh, in the county of Allegheny and State of Pennsylvania, have invented certain Improvements in Electric-Lighting Fixtures, of which the following is a specification.

My invention relates to improved means for inclosing electric wires and supporting lamps in circuit therewith so that such lamps can be adjusted universally in a simple manner and automatically held in the various positions to which they may adjusted.

The improved means for effecting the purposes of the invention are characterized by a flexible conduit having hollow sections connected by joints permitting movement about boxes having resilient covers clamped thereto in adjustable frictional relation, the respective boxes and covers being clamped together in such frictional contact that they can be turned readily and will hold automatically the position to which they are turned.

In the application of the invention to such establishments, for instance, as machine shops, where it is desirable to provide for a number of machines, lights that can be adjusted to various positions for use and held out of the way when not in use, I contemplate using a fixed main conduit for inclosing and supporting a pair of electric conductors and the desired number of flexible branch conduits for supporting lamps and inclosing branch conductors leading thereto.

The nature and advantages of the invention will more fully appear by reference to the following description and the accompanying drawings in illustration thereof.

In the drawings, Figure 1 illustrates an application of the invention, Fig. 2 is a plan view of a section of a flexible conduit showing a joint comprising a box with a resilient disk clamped thereto; Fig. 3 is a longitudinal sectional view through the center of the construction shown in Fig. 2; Fig. 4 is a top plan view of a box with its cover removed, and Fig. 5 is a sectional view through the axis of a box and cover of modified construction.

The invention, in the forms thereof illustrated, comprises the stationary main conduit 1 having flexible branch conduits comprising the respective sections 2, 3, 4, and 5 connected by the joints 6, 7, and 8, the joints being constructed and disposed so as to permit universal movement over a comparatively extended field of the lamps 9 which are connected to the sections 5.

As illustrated in Figs. 2, 3, and 4, the respective joints comprise a box 10 having an internally threaded boss 10ª for engagement with a conduit section, a peripheral flange 10ᵇ for providing a peripheral clamping surface, and a tongue 10ᶜ for supporting a bolt.

A resilient cover 11 in the form of a dished disk is provided for engagement with each box, the cover having the eccentric aperture 11ª for the passage of conductors, the peripheral flange 11ᵇ for engaging the flange 10ᵇ and the radial slots 11ᶜ for providing resiliency.

A hollow boss 12, internally threaded to engage a conduit section, is fixed to the cover in registration with the aperture 11ª, the boss having thereon an ear 12ª engaged to the dished body of the cover.

A bolt 13 extends through the box 10 and the cover 11 with the lug 12ª thereon, passing through the tongue 10ᶜ to hold the bolt firmly in central position, the nut 13ª being drawn up on the bolt to effect the desired frictional contact between the flanges 10ᵇ and 11ᵇ, so that the parts 10 and 11 can be turned relatively and will hold the position to which they are turned.

Conductors 14 inclosed and supported by the conduit 1 have electrically connected therewith branch conductors 15 which are inclosed and supported by the respective flexible conduits and have the lamps 9 in circuit therewith. These branch conductors 15 pass between the conduit sections through their joints, namely, through the boxes 10 and covers 11 with the bosses 12 thereon, being kept in place by coils thereof around the bolts 13, the insertion of the branches being readily effected by separating the covers from the boxes and replacing them thereafter.

The tongue 10ᶜ permits the cover 11 to turn through the greater part of a revolution without engagement or obstruction, while the bosses 10ª and 12 engage to prevent a complete revolution and the engagement or undue twisting of the branch conductors.

As illustrated in Fig. 5, a modified form of box 10′ is provided with a conical bearing surface 10″ and a dished resilient cover 11′ is provided with a slotted conical periphery 11″ which is drawn into the desired frictional relation to the box by the bolt 13, which passes through the box, the cover and the boss 12 thereon, the engaging conical surfaces holding the box and cover in the desired axial relation.

It will be understood that the structure illustrated may be modified variously. The conduit 1 is not essential as the conductors 14 may be exposed and supported in any usual manner. The joints in the flexible conduits may be used singly, or plural joints with parallel axes may be used where universal movement is not required. Coiling the conductors on the bolts in the hollow boxes or joints serves not only to keep such conductors in place but also to provide a certain amount of desirable slack therein.

Having described my invention, I claim:

1. A lamp fixture comprising a universally flexible conduit having a continuous passage therethrough for inclosing conductors and supporting a lamp in circuit therewith, said conduit comprising a hollow section having a box connected with an end thereof, a hollow section having a resilient box cover connected with an end thereof, and a bolt whereby said box and cover are clamped together in frictional relation and adapted to be turned relatively.

2. A lamp fixture comprising a universally flexible conduit composed of hollow sections and hollow flexible joints having a continuous passage therethrough, said joints having transverse axes and comprising respectively a box having a frictional clamping part, a dished box cover having a frictional clamping part with slots for providing resiliency, and a bolt for clamping said box and cover together with said parts in frictional engagement.

3. A lamp fixture comprising a flexible conduit adapted for containing conductors and supporting a lamp adjustably, said conduit having a section provided with a hollow end member comprising a peripheral flange with a frictional clutching surface, a second section provided with a dished end member comprising a slotted peripheral part with a frictional clutching surface adapted for engaging said surface first named, and a bolt whereby said members are clamped together in relatively movable relation.

4. A lamp fixture comprising conduit having joints with transverse axes of revolution for containing conductors and supporting a lamp in circuit therewith, said conduit comprising hollow sections, a box having a threaded hollow boss connected with one of said sections, a box cover having an aperture therein, a threaded hollow boss fixed to said cover for connecting it to another of said sections, and a bolt whereby said box and cover are clamped together in relatively turning relation, said bosses being adapted to engage to prevent a complete revolution in said turning operation.

5. A lamp fixture comprising a hollow conduit having sections connected by flexible joints provided with transverse axes, each of said joints comprising a box having a peripheral boss connected with one of said sections and provided with a circular bearing surface concentric with its axis, a box cover having a boss connecting the top thereof with another of said sections and provided with a circular bearing surface concentric with its axis, and a bolt passing axially through said box and cover to clamp said surfaces in relatively movable relation.

In testimony whereof I have hereunto set my name this 14th day of May, 1918.

JOHN S. ROMIG.

Attest:
ALICE E. DUFF,
C. W. RICHEY.

Copies of this patent may be obtained for five cents each, by addressing the "Commissioner of Patents, Washington, D. C."